UNITED STATES PATENT OFFICE 2,392,366

REACTION PRODUCTS OF ALDEHYDES AND TRIAZINE DERIVATIVES

Gaetano F. D'Alelio and James W. Underwood, Pittsfield, Mass., assignors to General Electric Company, a corporation of New York No Drawing. Application August 19, 1942, Serial No. 455,356

22 Claims. (Cl. 260—42)

This invention relates to the production of new synthetic materials and especially to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a triazine derivative corresponding to the following general formula:

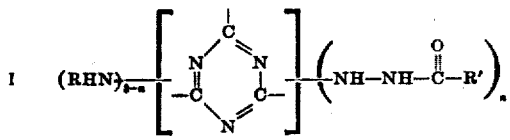

In the above formula $n$ represents an integer and is at least 1 and not more than 3, R represents a member of the class consisting of hydrogen and monovalent hydrocarbon and substituted hydrocarbon radicals, more particularly halohydrocarbon radicals, and R' represents a member of the class consisting of monovalent aliphatic hydrocarbon radicals and monovalent aromatic and nuclearly substituted, specifically nuclearly halogenated, aromatic hydrocarbon radicals. From the above formula it will be noted that when $n$ is 3 there will be no —NHR groups attached to the triazine nucleus.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples or halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R is hydrogen.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents a lower alkyl radical or a phenyl radical.

Instead of the symmetrical triazines (s-triazines) represented by Formula I, corresponding derivatives of the asymmetrical triazines or of the vicinal triazines may be used.

The triazine derivatives that are used in carrying the present invention into effect are more fully described and are specifically claimed in our copending application Serial No. 455,357, filed concurrently herewith and assigned to the same assignee as the present invention. More specific examples of triazine derivatives that may be employed in producing our new condensation products are the tri-(acylhydrazino) s-triazines, the di-(acylhydrazino) amino (—NHR) s-triazines and the carboacylhydrazino diamino [(—NHR)₂] s-triazines. As pointed out in copending application Serial No. 455,357, a method of preparing the triazine derivatives used in carrying the present invention into effect comprises effecting reaction in the presence of a hydrohalide acceptor, e. g., a tertiary base such as a trialkyl or a triaryl amine, between (1) a hydrazino triazine corresponding to the general formula

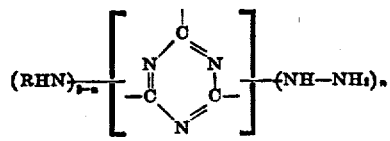

where $n$ and R have the same meanings as given above with reference to Formula I, and (2) a compound corresponding to the general formula

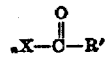

where X represents a halogen atom, and $n$ and R' have the same meanings as given above with reference to Formula I.

Other examples of triazine derivatives embraced by Formula I that may be employed in practicing our invention are listed below:

Acetylhydrazino diamino s-triazine
Di-(acetylhydrazino) amino s-triazine
Tri-(acetylhydrazino) s-triazine
Acetylhydrazino di-(methylamino) s-triazine
Propionylhydrazino diamino s-triazine
Butyrylhydrazino diamino s-triazine
Di-(butyrylhydrazino) amino s-triazine
Tri-(butyrylhydrazino) s-triazine
Valerylhydrazino diamino s-triazine
Di-(valerylhydrazino) amino s-triazine
Tri-(valerylhydrazino) s-triazine
Butyrylhydrazino di-(methylamino) s-triazine
Valerylhydrazino di-(ethylamino) s-triazine
Benzoylhydrazino di-(allylamino) s-triazine
Chlorobenzoylhydrazino di-(methylamino) s-triazine
Propionylhydrazino di-(chloroethylamino) s-triazine
Butyrylhydrazino di-(bromoanilino) s-triazine
Di-(propionylhydrazino) hexylamino s-triazine
Tri-(bromobenzoylhydrazino) s-triazine
Acetylhydrazino di-(ethylamino) s-triazine
Propionylhydrazino di-(methylamino) s-triazine
Propenoylhydrazino diamino s-triazine
Di-(propionylhydrazino) amino s-triazine
Tri-(propionylhydrazino) s-triazine
Di-(propionylhydrazino) methylamino s-triazine
Acetylhydrazino di-(butylamino) s-triazine
Acetylhydrazino di-(propenylamino) s-triazine
Propionylhydrazino di-(cyclohexylamino) s-triazine
Acetylhydrazino dianilino s-triazine
Acetylhydrazino ditoluido s-triazine
Acetylhydrazino dixylidino s-triazine
Acetylhydrazino di-(phenethylamino) s-triazine
Di-(acetylhydrazino) anilino s-triazine
Di-(acetylhydrazino) toluido s-triazine
Di-(acetylhydrazino) xylidino s-triazine
Acetylhydrazino di-(ethylanilino) s-triazine
Acetylhydrazino di-(chloroanilino) s-triazine
Acetylhydrazino di-(benzylamino) s-triazine
2-acetylhydrazino 4-methylamino 6-amino s-triazine (4-acetylhydrazino 2-methylamino 6-amino s-triazine; 6-acetylhydrazino 2-methylamino 4-amino s-triazine)
2-acetylhydrazino 4-anilino 6-amino s-triazine
2-acetylhydrazino 4-anilino 6-methylamino s-triazine
Benzoylhydrazino diamino s-triazine
Chlorobenzoylhydrazino diamino s-triazine
Di-(benzoylhydrazino) amino s-triazine
Tri-(benzoylhydrazino) s-triazine
Toluylhydrazino diamino s-triazine
Di-(toluylhydrazino) amino s-triazine
Tri-(toluylhydrazino) s-triazine
Dimethylbenzoylhydrazino diamino s-triazine
Chlorobenzoylhydrazino di-(chloroethylamino) s-triazine
Di-(benzoylhydrazino) methylamino s-triazine
Di-(acetylhydrazino) benzoylhydrazino s-triazine
Di-(acetylhydrazino) propionylhydrazino s-triazine
2-acetylhydrazino 4-benzoylhydrazino 6-propionylhydrazino s-triazine
Acetylhydrazino di-(fluoroanilino) s-triazine
Propionylhydrazino di-(iodoanilino) s-triazine
Benzoylhydrazino di-(bromotoluido) s-triazine
Bromobenzoylhydrazino di-(bromoanilino) s-triazine
Acetylhydrazino di-(chlorotoluido) s-triazine
Acetylhydrazino di-(cyclohexylamino) s-triazine
Acetylhydrazino di-(octylamino) s-triazine
Acetylhydrazino di-(cyclohexenylamino) s-triazine
Acetylhydrazino di-(allylamino) s-triazine
Di-(propionylhydrazino) methallylamino s-triazine The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in our copending application Serial No. 455,357.

In the production of molded articles from molding compositions comprising a filled or unfilled thermosetting resin, it is highly desirable that the molding compound have a high plastic flow during molding combined with a rapid cure to an insoluble and infusible state. Surprisingly it was found that the heat-curable resinous condensation products of this invention and molding compositions made therefrom show excellent flow characteristics during a short curing cycle. The molded articles have a high dielectric strength and a very good resistance to arcing. They have a good surface finish and excellent resistance to water, being better, in general, than the ordinary urea-formaldehyde resins in this respect. This was quite surprising and unexpected and in no way could have been predicted. The cured resins of the present invention also have a high resistance to heat and abrasion and, therefore, are especially suitable for use where optimum heat- and abrasion-resistance are properties of primary importance.

Resins heretofore have been made by condensing an aldehyde with an aminotriazine, e. g., melamine. The suggestion also has been made that resinous materials be prepared by condensing an aliphatic aldehyde containing a chain of at the most six carbon atoms with compounds of the general formula II 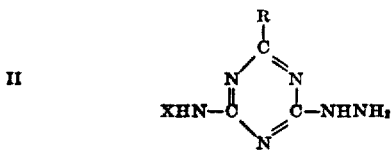

wherein X stands for a member of the group consisting of hydrogen and the amino ($-NH_2$) radical, and R represents a member of the class consisting of hydrazino, phenyl, hydroxy, alkoxy and thioether groups and halogen atoms. Such resins generally have excellent heat and arc resistance, but are deficient in other properties that are desirable in a resin to be used in the production of molding compositions and molded articles. For example, the high basicity of cyanurtrihydrazide, which is embraced by Formula II, imparts to resins prepared therefrom, and to articles molded from molding compounds made from such resins, unsatisfactory curing characteristics and a poorer resistance to aqueous solvents (particularly aqueous solvents containing acidic materials) than many applications require. Furthermore, the plasticity during molding often is unsatisfactory. These and other disadvantages in the materials of this class heretofore known in the resin art are avoided by using as a starting reactant a triazine derivative wherein at least one of the substituent groupings attached to the carbon atoms of the triazine nucleus is a carboacylhydrazino grouping.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde - non - reactable nitrogen - containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, fillers, other natural or synthetic resinous bodies, or while admixed with other materials that also can react with the aldehydic reactant or with the triazine derivative, e. g., urea ($NH_2CONH_2$), thiourea, selenourea and iminourea (guanidine), substituted ureas, thioureas, selenoureas and iminoureas, more particularly urea derivatives such as mentioned, for example, in D'Alelio Patent No. 2,285,418, page 1, column 1, lines 41–49; monoamides of monocarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminodiazines; aldehyde-reactable triazines other than the triazine derivatives constituting the primary components of the resins of the present invention, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent 2,239,441; monohydric and polyhydric alcohols, e. g., butyl alcohol, heptyl alcohol, amyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative to form an intercondensation product by mixing all the reactants and effecting condensation therebetween or by various permutations of reactants as described, for example, in D'Alelio Patent No. 2,285,418 with particular reference to reactions involving a urea, an aliphatic aldehyde and a chlorinated acetamide. For example, we may form a partial condensation product of ingredients comprising (1) urea or melamine or urea and melamine, (2) a triazine derivative of the kind embraced by Formula I, for instance acetylhydrazino diamino s-triazine, di-(acetylhydrazino) amino s-triazine, tri-(acetylhydrazino) s-triazine, propionylhydrazino diamino s-triazine, acetylhydrazino di-(methylamino) s-triazine, etc., and (3) an aldehyde, including polymeric aldehydes, hydroxyaldehydes and aldehyde-addition products, e. g., formaldehyde, paraformaldehyde, aldol, glyceraldehyde, dimethylol urea, a polymethylol melamine, e. g., hexamethylol melamine, etc. Thereafter, we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

| | Parts |
|---|---|
| Acetylhydrazino diamino s-triazine | 109.8 |
| Aqueous formaldehyde (approx. 37.1% HCHO) | 194.4 |
| Sodium hydroxide in 5 parts water | 0.1 |
| Aqueous ammonia (approx. 28% NH₃) | 10.0 | were heated together under reflux at the boiling temperature of the mass for 15 minutes, yielding a clear, colorless syrup. When a small sample of this syrup was heated on a 140–150° C. hot plate it was converted into an infusible mass. When the syrupy condensation product was treated with a small amount of chloroacetamide (monochloroacetamide), followed by heating on a 140° C. hot plate, the curing of the syrup to an insoluble and infusible state was materially accelerated.

One part of chloroacetamide was added to the main portion of the resinous syrup and heating under reflux was continued for an additional 5 minutes. The pH of the syrup at the end of this reaction period was 7.08. This syrupy resin cured rapidly when tested on a 140° C. hot plate. The syrup was divided into two equal parts. To one portion of the syrup was added 40 parts alpha cellulose in flock form and 0.2 part of a mold lubricant, specifically zinc stearate. To the other portion was added 100 parts asbestos and 0.2 part zinc stearate. The wet molding compounds produced in this manner were dried at 65° C. The composition containing the alpha cellulose was dried for 1¼ hours and the asbestos-containing compound for 3 hours. Samples of the dried and ground molding compositions then were molded at 130° C. under a pressure of 2,000 pounds per square inch. The cellulosic composition was molded for 4 minutes and the asbestos compound for 5 minutes. In both cases well-cured molded pieces were obtained. The molded articles had very good resistance to water as shown by the fact that when the individual sample was immersed in boiling water for 15 minutes, followed by immersion in cold water for 5 minutes, the molded piece containing the cellulosic filler absorbed only 0.27% by weight of water and the one containing the asbestos only 1.18% by weight of water. Both molding compounds showed very good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, ethylene diamine hydrochloride, aminoacetamide hydrochloride, the ethanolamine hydrochlorides, nitrourea, chloroacetyl urea, chloroacetone, glycine, sulfanic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

Example 2

| | Parts |
|---|---|
| Acetylhydrazino diamino s-triazine | 11.0 |
| Urea | 24.0 |
| Aqueous formaldehyde (approx. 37.1% HCHO) | 97.2 |
| Sodium hydroxide in 2.5 parts water | 0.05 |
| Aqueous ammonia (approx. 28% NH₃) | 3.5 |
| Chloroacetamide | 0.5 |

All of the above ingredients with the exception of the chloroacetamide were heated together under reflux at the boiling temperature of the mass for 30 minutes. The chloroacetamide was now added and heating under reflux was continued for an additional 10 minutes. A molding compound was prepared from the resulting resinous syrup by mixing therewith 35 parts alpha cellulose and 0.2 part zinc stearate. The wet molding compound was dried for 2 hours at 65° C. A well-cured molded piece having a good surface finish and a well-knit and homogeneous structure was obtained by molding a sample of the dried and ground molding compound for 6 minutes at 130° C. under a pressure of 2,000 pounds per square inch. The molding composition showed very good plastic flow during molding.

Example 3

| | Parts |
|---|---|
| Acetylhydrazino diamino s-triazine | 27.5 |
| Para-ureido benzene sulfonamide | 32.2 |
| Aqueous formaldehyde (approx. 37.1% HCHO) | 97.2 |
| Sodium hydroxide in 2.5 parts water | 0.05 |
| Aqueous ammonia (approx. 28% NH₃) | 6.0 |
| Chloroacetamide | 0.5 |

All of the above ingredients with the exception of the chloroacetamide were heated together under reflux at boiling temperature for 15 minutes, at the end of which period of time the chloroacetamide was added and refluxing was continued for an additional 4 minutes. Forty (40) parts alpha cellulose and 0.2 part zinc stearate were mixed with the resulting resinous syrup to form a molding compound. The wet molding composition was dried at 70° C. for 1½ hours. A sample of the dried and ground molding compound was molded for 5 minutes at 130° C. under a pressure of 2,000 pounds per square inch, yielding a well-cured molded piece having a well-knit and homogeneous structure. The molding composition showed excellent plasticity during molding.

Example 4

| | Parts |
|---|---|
| Acetylhydrazino diamino s-triazine | 36.6 |
| Dimethylol urea (commercial grade containing approx. 11% by weight of water) | 81.0 |
| Sodium hydroxide in 5 parts water | 0.1 |
| Aqueous ammonia (approx. 28% NH₃) | 10.0 |
| Chloroacetamide | 1.0 |
| Water | 120.0 |

All of the above components with the exception of the chloroacetamide were heated together under reflux at boiling temperature for 20 minutes. The chloroacetamide was now added and heating under reflux was continued for an additional 10 minutes. A molding compound was prepared from the resulting resinous syrup by mixing therewith 70 parts alpha cellulose and 0.4 part zinc stearate. The wet molding composition was dried at 70° C. for 3 hours. A sample of the dried and ground molding compound was molded as described under Example 3. The molded piece was well cured and had very good resistance to water as shown by the fact that it absorbed only 1.9% by weight of water when tested for its water resistance as described under Example 1. The molded product had a well-knit and homogeneous structure. The molding compound had good heat stability as shown by the fact that even after heating for 20 hours at 70° C. the molding composition still possessed sufficient plasticity during molding to yield a well-molded product.

*Example 5*

| | Parts |
|---|---|
| Acetylhydrazino diamino s-triazine | 54.9 |
| Acrolein | 67.2 |
| Sodium hydroxide in 5 parts water | 0.1 |
| Water | 100.0 | were heated together under reflux at the boiling temperature of the mass for 15 minutes, yielding a thick syrup containing a small amount of precipitated resin.

When a small sample of this resin was heated on a 140° C. hot plate it cured slowly to an infusible mass. The addition of a curing agent such as mentioned under Example 1, for instance, sulfamic acid, glycine, nitrourea, etc., accelerated the cure of the resin to the insoluble and infusible state. The resinous composition of this example may be used in the production of molding compositions.

*Example 6*

| | Parts |
|---|---|
| Acetylhydrazino diamino s-triazine | 54.9 |
| Butyl alcohol | 111.0 |
| Aqueous formaldehyde (approx. 37.1% HCHO) | 97.2 |
| Sodium hydroxide in 5 parts water | 0.1 | were heated together under reflux at the boiling temperature of the mass for approximately 30 minutes, yielding a clear, colorless syrup. When a sample of this syrup was heated on a 140° C. hot plate it was converted into a transparent, tough, thermoplastic film. The uncured resin was soluble in ethyl alcohol. The syrupy condensation product was potentially heat-curable as evidenced by the fact that when chloroacetamide, citric acid, nitrourea or other curing agent such as mentioned under Example 1 was incorporated either into the syrup or into the dehydrated resin, followed by heating on a 140° C. hot plate, an insoluble and infusible resin was obtained. The solubility and film-forming characteristics of the resinous material of this example make it particularly suitable for use in the preparation of liquid coating compositions.

*Example 7*

| | Parts |
|---|---|
| Acetylhydrazino diamino s-triazine | 54.9 |
| Acetamide | 18.0 |
| Aqueous formaldehyde (approx. 37.1% HCHO) | 97.2 |
| Sodium hydroxide in 5 parts water | 0.1 | were heated together under reflux at boiling temperature for 15 minutes, yielding a clear syrup. This syrupy condensation product was potentially heat-curable as shown by the fact that when citric acid, glycine or other curing agent such as mentioned under Example 1 was added to the syrup, followed by heating at 140° C., the resinous material was converted to a cured or insoluble and infusible state. The plasticity of the thermosetting resin during curing indicated that the product of this example would be suitable for use as a modifier of aminoplasts and other synthetic resins of unsatisfactory flow characteristics to improve the plasticity thereof.

*Example 8*

| | Parts |
|---|---|
| Acetylhydrazino diamino s-triazine | 54.9 |
| Aqueous formaldehyde (approx. 37.1% HCHO) | 97.2 |
| Glycerine | 27.6 |
| Sodium hydroxide in 5 parts water | 0.1 | were heated together under reflux at boiling temperature for 5 minutes, yielding a thick syrup that gelled upon cooling to room temperature. The plasticity and curing characteristics of the resinous material of this example were much the same as the product of Example 7.

*Example 9*

| | Parts |
|---|---|
| Acetylhydrazino diamino s-triazine | 54.9 |
| Diethyl malonate | 48.0 |
| Aqueous formaldehyde (approx. 37.1% HCHO) | 97.2 |
| Sodium hydroxide in 5 parts water | 0.1 | were heated together under reflux at boiling temperature for 5 minutes, yielding a gelled resin. This resin melted and then cured to an infusible state when a sample of it was heated on a 140° C. hot plate. The cured resin was white and had outstanding flexibility in film form. In its cured state the resin was not affected by solvents such as ethyl alcohol, benzene and Solvatone.

*Example 10*

| | Parts |
|---|---|
| Acetylhydrazino diamino s-triazine | 18.3 |
| Polyvinyl alcohol | 26.4 |
| Aqueous formaldehyde (approx. 37.1% HCHO) | 48.6 |
| Sodium hydroxide in 5 parts water | 0.1 |
| Water | 100.0 | were heated together under reflux at the boiling temperature of the mass for 15 minutes, yielding a clear, very viscous syrup. When a sample of this syrup was heated on a 140° C. hot plate, it bodied to a thermoplastic resin. When a sample of the resin was treated with a small amount of hydrochloric acid and the resulting material then heated on a 140° C. hot plate, a tough, infusible, water-resistant film was formed. Instead of hydrochloric acid, other curing agents such as mentioned under Example 1 may be employed to improve the curing characteristics and the water resistance of the resinous material of this example.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10, inclusive, at boiling temperature under reflux, the reaction between the components may be carried out at lower temperatures, for example, at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific carbo acylhydrazino s-triazine named in the above illustrative examples. Thus, instead of acetylhydrazino diamino s-triazine we may use, for example, di-(acetylhydrazino) amino s-triazine, tri-(acetylhydrazino) s-triazine, propionylhydrazino diamino s-triazine, acetylhydrazino di-(methylamino) s-triazine, or any other compound of the kind embraced by Formula I, numerous examples of which have been given above and in our copending application Serial No. 455,357.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Particularly good results are obtained with active methylene-containing bodies such as a methylol urea, more particularly mono- and dimethylol ureas, and a methylol melamine, e. g., monomethylol melamine and polymethylol melamines (di-, tri-, tetra-, penta-, and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending, for example, upon the particular properties desired in the finished product. Ordinarily these reactants are employed in an amount corresponding to at least one mol of the aldehyde, specifically formaldehyde, for each mol of the triazine derivative. Thus, we may use, for example, from 1 to 8 or 9 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., monohydric alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio Patent No. 2,281,559; and others.

The modifying bodies also may take the form of high molecular weight bodies with or without resinous characteristics, for example, hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding together mica flakes in the production of resin-bonded abrasive articles such, for instance, as grind stones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

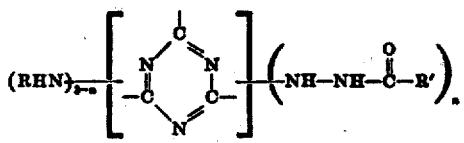

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition as in claim 1 wherein the aldehyde is formaldehyde.

3. A composition as in claim 1 wherein R represents hydrogen.

4. A composition as in claim 1 wherein R' represents an alkyl radical.

5. A composition as in claim 1 wherein R represents a hydrogen atom and R' represents an alkyl radical.

6. A composition as in claim 1 wherein the reaction product is an alkaline-catalyzed reaction product of the stated components.

7. A composition as in claim 1 wherein the reaction product is an alcohol-modified reaction product of the stated components.

8. A heat-curable resinous composition comprising a heat-convertible condensation product of ingredients including formaldehyde and a compound corresponding to the general formula

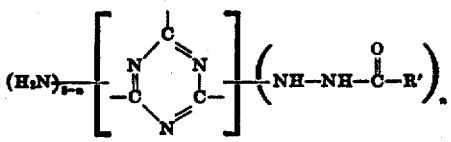

where $n$ represents an integer and is at least 1 and not more than 3, and R' represents a member of the class consisting of monovalent aliphatic hydrocarbon radicals and monovalent aromatic and nuclearly halogenated aromatic hydrocarbon radicals.

9. A product comprising the cured composition of claim 8.

10. A composition comprising the resinous product of reaction of ingredients including an aldehyde and a compound corresponding to the general formula

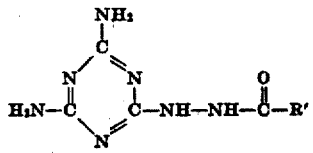

where R' represents a member of the class consisting of monovalent aliphatic hydrocarbon radicals and monovalent aromatic and nuclearly halogenated aromatic hydrocarbon radicals.

11. A resinous composition comprising the condensation product of ingredients comprising an acetylhydrazino diamino s-triazine and formaldehyde.

12. A composition comprising the resinous product of reaction of ingredients including an aldehyde and a compound corresponding to the general formula

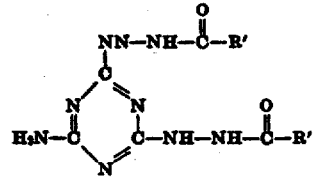

where R' represents a member of the class consisting of monovalent aliphatic hydrocarbon radicals and monovalent aromatic and nuclearly halogenated aromatic hydrocarbon radicals.

13. A resinous composition comprising the condensation product of ingredients comprising di-(acetylhydrazino) amino s-triazine and formaldehyde.

14. A composition comprising the product of reaction of ingredients comprising a urea, an aldehyde and a compound corresponding to the general formula

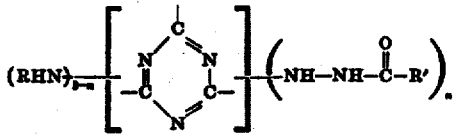

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

15. A composition as in claim 14 wherein R represents hydrogen, the aldehyde is formaldehyde and the urea component is the compound corresponding to the formula $NH_2CONH_2$.

16. A resinous composition comprising the product of reaction of ingredients comprising urea, formaldehyde and acetylhydrazino diamino s-triazine.

17. A composition comprising the product of reaction of ingredients comprising melamine, an aldehyde and a compound corresponding to the general formula

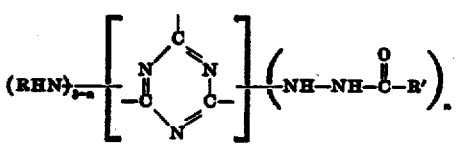

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

18. A resinous composition comprising the product of reaction of ingredients including (1) melamine, (2) formaldehyde and (3) a compound corresponding to the general formula

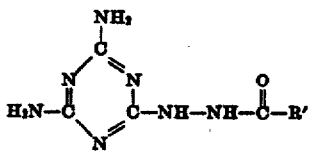

where R' represents a member of the class consisting of monovalent aliphatic hydrocarbon radicals and monovalent aromatic and nuclearly halogenated aromatic hydrocarbon radicals.

19. A heat-curable composition comprising the heat-convertible resinous reaction product of (1) a product of partial reaction of ingredients including formaldehyde and a compound corresponding to the general formula

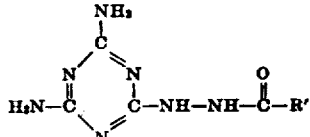

where R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

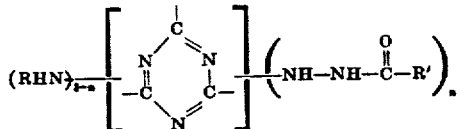

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

21. A composition comprising the resinous reaction product of (1) a chlorinated acetamide and (2) a product of partial reaction of ingredients including formaldehyde and a compound corresponding to the general formula

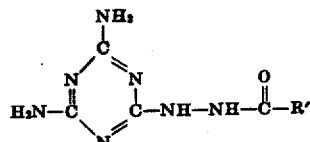

where R' represents a member of the class consisting of monovalent aliphatic hydrocarbon radicals and monovalent aromatic and nuclearly halogenated aromatic hydrocarbon radicals.

22. A composition comprising the resinous reaction product of (1) a chlorinated acetamide and (2) a product of partial reaction under alkaline conditions of ingredients including acetylhydrazino diamino s-triazine and formaldehyde.

GAETANO F. D'ALELIO.
JAMES W. UNDERWOOD.

---

Certificate of Correction

Patent No. 2,392,366. January 8, 1946.

GAETANO F. D'ALELIO ET AL.

It is hereby certified that errors appear in the printed specification of the above numbered patent requiring correction as follows: Page 1, first column, line 51, for "or" before "halogeno-substituted" read *of*; and second column, lines 29 and 30, for "acylhydrazino" read *carboacylhydrazino*; page 4, first column, line 68, for "sulfanic" read *sulfamic*; page 7, second column, line 5, for that portion of the formula reading "NN" read *NH*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.* cals and monovalent aromatic and nuclearly halogenated aromatic hydrocarbon radicals.

19. A heat-curable composition comprising the heat-convertible resinous reaction product of (1) a product of partial reaction of ingredients including formaldehyde and a compound corresponding to the general formula

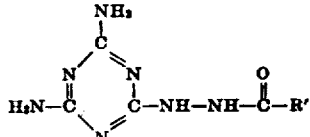

where R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

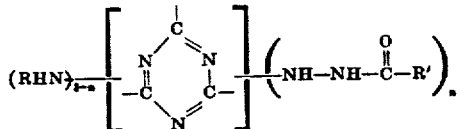

where $n$ represents an integer and is at least 1 and not more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

21. A composition comprising the resinous reaction product of (1) a chlorinated acetamide and (2) a product of partial reaction of ingredients including formaldehyde and a compound corresponding to the general formula

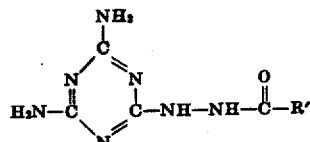

where R' represents a member of the class consisting of monovalent aliphatic hydrocarbon radicals and monovalent aromatic and nuclearly halogenated aromatic hydrocarbon radicals.

22. A composition comprising the resinous reaction product of (1) a chlorinated acetamide and (2) a product of partial reaction under alkaline conditions of ingredients including acetylhydrazino diamino s-triazine and formaldehyde.

GAETANO F. D'ALELIO.
JAMES W. UNDERWOOD.

---

Certificate of Correction

Patent No. 2,392,366.   January 8, 1946.

GAETANO F. D'ALELIO ET AL.

It is hereby certified that errors appear in the printed specification of the above numbered patent requiring correction as follows: Page 1, first column, line 51, for "or" before "halogeno-substituted" read *of*; and second column, lines 29 and 30, for "acylhydrazino" read *carboacylhydrazino*; page 4, first column, line 68, for "sulfanic" read *sulfamic*; page 7, second column, line 5, for that portion of the formula reading "NN" read *NH*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.*